Sept. 2, 1924.

H. W. SWEET ET AL 1,507,217

GEAR SHIFTING MECHANISM

Filed Nov. 10, 1922      3 Sheets-Sheet 1

INVENTORS.
Henry W. Sweet & George C. Carhart
BY
Parsons & Bedell
ATTORNEYS.

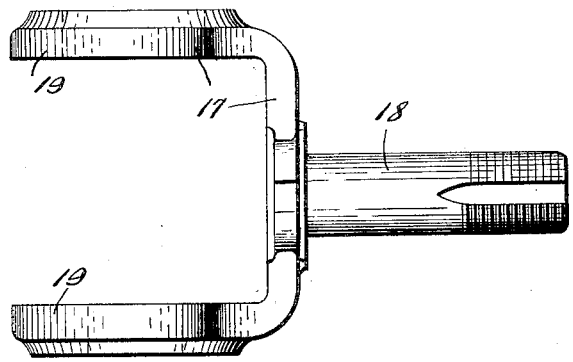
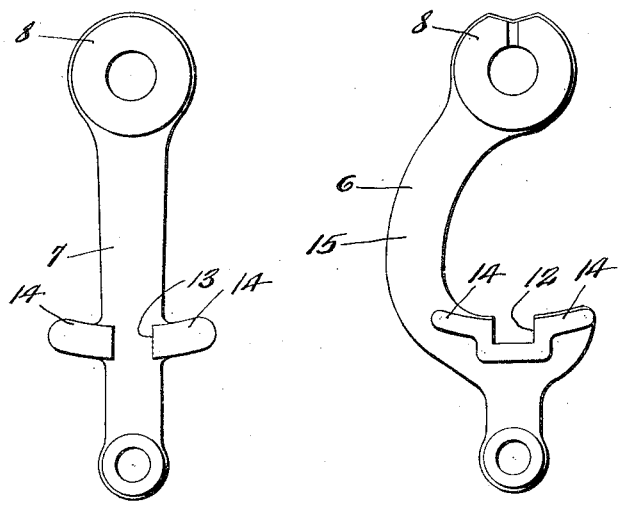

Patented Sept. 2, 1924.

1,507,217

UNITED STATES PATENT OFFICE.

HENRY W. SWEET AND GEORGE C. CARHART, OF SYRACUSE, NEW YORK, ASSIGNORS TO BROWN-LIPE GEAR COMPANY, OF SYRACUSE, NEW YORK, A CORPORATION OF NEW YORK.

GEAR-SHIFTING MECHANISM.

Application filed November 10, 1922. Serial No. 600,045.

*To all whom it may concern:*

Be it known that we, HENRY W. SWEET and GEORGE C. CARHART, citizens of the United States, and residents of Syracuse, in the county of Onondaga and State of New York, have invented a new and useful Gear-Shifting Mechanism, of which the following is a specification.

This invention relates to a shifting mechanism for selective change speed transmission gearing, such as are used in motor vehicles, and has for its object a shifting mechanism which is a particularly simple, compact and unitary structure and which is highly efficient and easily operable in use.

The invention consists in the novel features, and in the combinations and constructions hereinafter set forth and claimed.

In describing this invention, reference is had to the accompanying drawings in which like characters designate corresponding parts in all the views.

Figure 3 is a plan view of the mounting for the shifting lever.

Figure 4 is a detail view of one of the side motion transmitting levers.

Figure 5 is a similar view of the middle motion transmitting lever.

Figure 1:
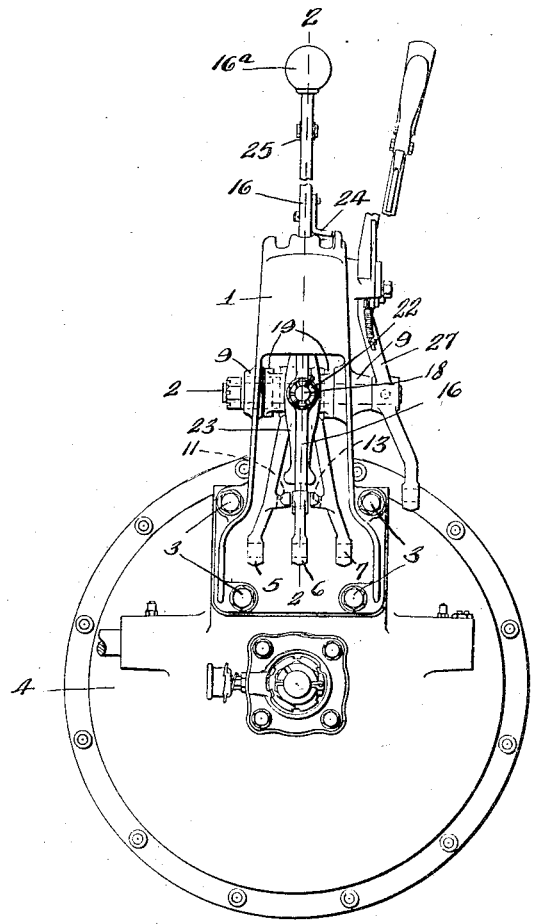
Figure 1 is an elevation of this shifting mechanism, the contiguous portion of the clutch casing and adjacent parts being shown.
Figure 2:
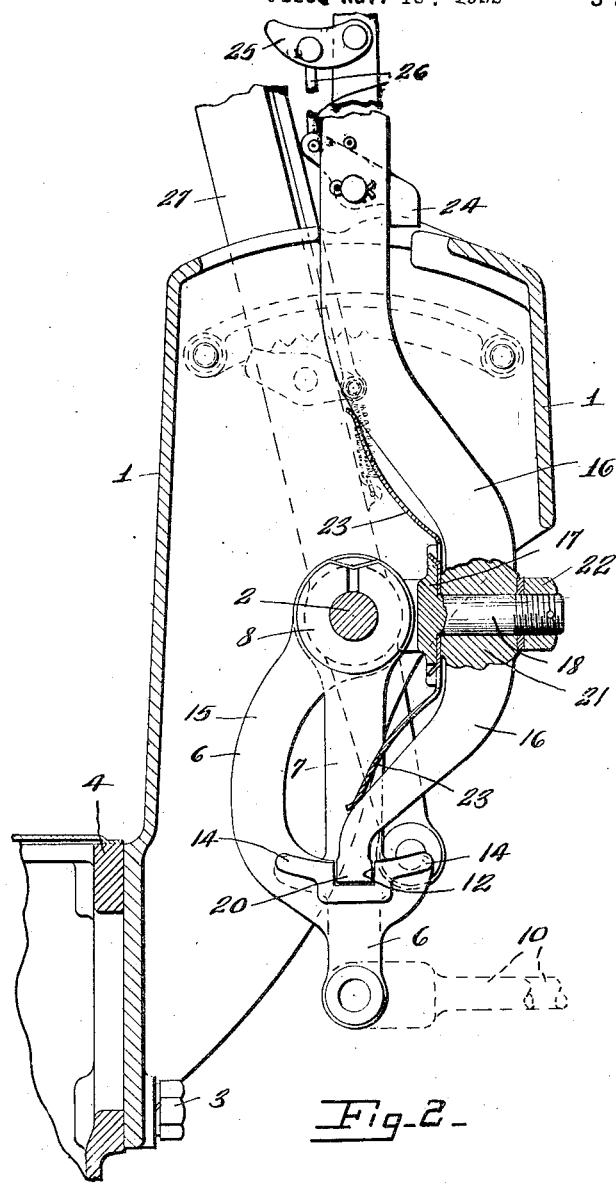
Figure 2 is a sectional view, taken approximately on the plane of line 2—2, Fig. 1.

This gear shifting mechanism comprises generally a support and a plurality of motion transmitting members carried by the support or frame and an operating lever also carried by the support and having a selective movement into engagement with any one of said members and a shifting movement to shift the selected members.

The support preferably comprises a frame or housing 1 and a shaft 2 supported at its ends in the side walls of the frame or housing. The housing is preferably attached as by screws 3 to the rear end of the casing 4 of the clutch of the motor vehicle.

The motion transmitting members are here illustrated as levers, these being illustrated as three levers 5, 6 and 7. Said levers 5, 6 and 7 are preferably mounted on the shaft 2 and are provided at their upper ends with hubs or bearings 8 mounted on said shaft 2 to rock about the shaft 2, which is non-rotatably mounted in hubs 9 on the side walls of the housing 1 in any suitable manner. The lower ends of the levers 5, 6 and 7 are connected to rods or links 10 which are connected to shiftable clutch sections or shiftable gears of a transmission gearing, as will be understood by those skilled in the art.

Each lever is provided between its ends with an upwardly facing transverse slot or recess 11, 12 or 13, for receiving the shifting lever to be described, these slots or recesses being normally arranged in transverse alinement. Each lever 5, 6, or 7 is also formed with a shield 14 on opposite sides of its slot for preventing lateral displacement of the shifting lever out of the slot of the next lever when the latter is in shifted position. The side levers 5 and 7, as here illustrated, extend substantially radially from the shaft 2, but diverge toward the lower ends and the slots or recesses 11 and 13 thereof are provided in brackets projecting from the inner opposing faces of such levers 5 and 7, so that the shifting lever is out of line with the side levers 5 and 7 when engaged therewith and hence the lever 5 or 7 does not interfere with the shifting or fore and aft movement of the shifting lever. The middle lever 6 is formed with a clearance for the shifting lever as such middle lever is in line with the fore and aft movement of the shifting lever when the shifting lever is engaged therewith, and the slot or recess 13 is not offset as in the levers 5 and 7. As illustrated, this clearance is formed by bowing the lever 6 forwardly as at 15.

The shifting lever 16 is mounted to shift fore and aft about the axis of the shaft 2 and at an angle to the shaft. As here illustrated, the lever 16 is supported on a mounting 17 movable about the axis of the shaft 2 and having projecting means as a radially extending stud 18 on which the lever 16 is pivotally mounted to swing laterally.

The mounting 17 is in the form of a yoke having hubs 19 on the shaft 2. These hubs thrust at their outer ends against the frame or housing 1 and the hubs 8 of the levers 5, 6, 7, are mounted on the shaft 2 between the hubs 19 of the yoke. The shifting lever is mounted between its ends on the stud 18 and the upper arm thereof extends through the top of the housing 1 and is provided with a suitable handle 16ª, while the lower arm is provided with an engaging end 20 for entering the slots or recess 11, 12, 13 in the motion transmitting levers 5, 6, 7.

In the illustrated embodiment of our invention the upper and lower portions of the lever 16 are located radially relatively to the shaft 2 and the intermediate portion 21 which is mounted on the stud 18 is offset or deflected out of the radial lines of the end portions of the lever.

The lever 16 is held on the stud 18 by a nut 22, and it is thrust outwardly against the nut to take up any looseness by a spring. The spring here shown is a leaf 23 mounted between its ends on the stud between the lever 16 and the intermediate part of the yoke 17, and having its arms above and below the stud arranged to press against the lever 16 and tend to thrust the lever 16 rearwardly against the nut.

The lever 16 is provided with a suitable lock 24, as a pawl, pivoted to the lever above the housing 1 and coacting with shoulders on the top of the housing. The pawl is operated by a member 25 on the lever 16 and located to be operated by the hand grasping the handle of the lever 16. A link 26 connects the operating member 25 and the pawl 24.

A brake lever 27 is also mounted on the shaft 2 outside of the housing.

Owing to the mounting of the various levers on the shaft 2, or to move about the shaft 2, a particularly strong, durable, compact and easily operated unit is produced.

In operation, the lever 16 is first shifted about the stud 18 to select a predetermined lever 5, 6 or 7 and then the lever 16 is moved fore or aft to shift the lever 5, 6, or 7 so selected, and in moving fore or aft, the mounting 17, moves about the shaft 2.

What we claim is:

1. In a gear shifting mechanism, the combination of a support, a shaft carried by the support, a yoke having hubs mounted on the shaft to move about the axis of the shaft, the yoke being formed with a shifting lever bearing extending substantially outwardly in a radial direction relatively to the shaft on one side of the shaft, motion transmitting levers mounted on the shaft between the hubs of the yoke, and an operating lever pivotally mounted on the bearing of the yoke and having a lateral selecting movement about such bearing into selective engagement with any one of the motion transmitting levers, and operable to move the yoke about the axis of the shaft and shift the selected lever.

2. In a gear shifting mechanism, the combination of a support, a shaft carried by the support, a yoke having hubs mounted on the shaft to move about the axis of the shaft, the yoke being formed with a shifting lever support extending in a radial direction relatively to the shaft, a plurality of motion transmitting levers mounted on the shaft, a shifting lever mounted on the shifting lever support, and movable laterally about an axis to select any one of the motion transmitting levers, and also being movable about the axis of the shaft, to move the yoke therewith and shift the selected motion transmitting lever, one of the motion transmitting levers being arranged in line with the shifting bearing.

3. In a gear shifting mechanism, the combination of a support, a shaft carried by the support, a shifting lever support having a hub mounted on the shaft to move about the same, and a shifting lever bearing extending in a radial direction at one side of the shaft, a plurality of motion transmitting levers mounted on the shaft adjacent the hub, said levers depending from the shaft, and a shifting lever pivotally mounted on the shifting lever bearing, and having a depending arm for selectively engaging any one of the motion transmitting levers below the shaft.

4. In a gear shifting mechanism, the combination of a support, a shaft carried by the support, a shifting lever support having a hub mounted on the shaft to move about the same, and also having a bearing extending in a radial direction relatively to the shaft at one side thereof, a plurality of motion transmitting levers mounted on the shaft adjacent the hub, one of said levers being arranged in line with the radial shifting lever bearing, and a shifting lever mounted on said radial bearing, and having means for engaging any one of the motion transmitting levers.

5. In a gear shifting mechanism, the combination of a support, a shaft carried by the support, a shifting lever support having a hub mounted on the shaft, and a bearing extending in a radial direction relatively to the axis of the shaft and at one side of the shaft, a plurality of motion transmitting levers mounted side by side on the shaft, one of said levers being arranged adjacent to the hub, and one of said levers being in line with the radial shifting lever bearing, and being formed with a cutout extending in a direction relatively to the shaft opposite to that in which the radial bearing for the shifting lever extends, and a shifting lever mounted on said radial bearing, and having an arm for selectively engaging any one of the motion transmitting levers.

6. In a gear shifting mechanism, the combination of a support, a shaft carried by the support, a shifting lever support having a hub mounted on the shaft, and a bearing extending in a radial direction relatively to the axis of the shaft and at one side of the shaft, a plurality of motion transmitting levers mounted side by side on the shaft, one of said levers being arranged adjacent to the hub, and one of said levers being in line with the radial shifting lever bearing, and being formed with a cutout extending in a direction relatively to the shaft opposite to that in which the radial bearing for the shifting lever extends, and a shifting lever mounted on said radial bearing, and having an arm for selectively engaging any one of the motion transmitting levers, said arm coacting with said levers when in neutral position, in a plane radial with the side, and the shaft at substantially a right angle to the axis of said radial bearing and the shaft lever.

7. In a gear shifting mechanism, the combination of a support, a shaft carried by the support, a shifting lever support having a hub mounted on the shaft to move about the same, and also having a radially extending shifting lever bearing at one side of the shaft, a plurality of motion transmitting levers mounted on the shaft side by side, adjacent the hub, the motion transmitting levers depending from the shaft, a shifting lever mounted on said relatively extending bearing and having a depending arm, the shifting lever having lateral selecting movement to carry the depending arm into interlocking engagement with any one of said motion transmitting levers and a shifting movement to carry the shifting lever support about the axis of the shaft, said arm engaging the motion transmitting levers in a plane radial with the axis of the shaft and at substantially a right angle to the axis of the shifting lever, and the motion transmitting lever in line with the shifting lever bearing, having a cutout extending in a direction relatively to the shaft opposite to that in which the shifting lever bearing extends.

8. In a gear shifting mechanism, the combination of a support, a shaft carried by the support, a yoke having spaced apart hubs mounted on the shaft to move about the same and having a shifting lever bearing projecting in a radial direction, a plurality of motion transmitting levers mounted on the shaft one of said motion transmitting levers being in line with said bearing and between said hubs, having a cutout extending in the opposite direction relative to the shaft from that in which the shifting lever bearing extends, a shifting lever mounted on the bearing, and having a depending arm arranged to selectively engage any one of the motion transmitting levers, in a plane substantially radial with the shaft and at substantially a right angle to the axis of the shifting lever bearing.

9. In a gear shifting mechanism, the combination of a support, a shaft carried by the support, a shifting lever carrier having a hub mounted on the shaft to move about the frame, and a stud extending in a substantially radial direction relatively to the shaft at one side of the shaft, motion transmitting levers, and a shifting lever mounted on the stud and having a lateral selecting movement into engagement with any one of the motion transmitting levers, a spring mounted on the stud, and having arms pressing against the shifting lever above and below the stud.

In testimony whereof, we have hereunto signed our names, at Syracuse, in the county of Onondaga, and State of New York, this 28th day of October, 1922.

HENRY W. SWEET.
GEORGE C. CARHART.